(12) United States Patent
Munar et al.

(10) Patent No.: US 10,757,592 B2
(45) Date of Patent: *Aug. 25, 2020

(54) DETERMINING NETWORK PERFORMANCE METRICS USING CUSTOMER-SPECIFIC INFORMATION

(71) Applicant: T-Mobile USA, Inc., Bellevue, WA (US)

(72) Inventors: Le Roy Munar, Snoqualmie, WA (US); Doris Ho, Bellevue, WA (US); Ting Zhang, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/147,309

(22) Filed: Sep. 28, 2018

(65) Prior Publication Data

US 2019/0104427 A1 Apr. 4, 2019

Related U.S. Application Data

(63) Continuation of application No. 15/462,746, filed on Mar. 17, 2017, now Pat. No. 10,091,679.

(51) Int. Cl.
*H04W 24/08* (2009.01)
*H04M 3/22* (2006.01)
(Continued)

(52) U.S. Cl.
CPC ......... *H04W 24/08* (2013.01); *H04M 3/2227* (2013.01); *H04M 3/5175* (2013.01);
(Continued)

(58) Field of Classification Search
CPC ..... H04W 24/10; H04W 24/08; H04W 24/02; H04W 72/082; H04W 72/085; H04W 52/243; H04W 64/00; H04W 72/0486; H04W 40/16; H04W 28/0236; H04W 28/048; H04W 72/0453; H04W 72/1226; H04W 88/08; H04W 52/241;
(Continued)

(56) References Cited

U.S. PATENT DOCUMENTS 6,246,886 B1 * 6/2001 Oliva .................... H04W 99/00
  455/426.1
6,304,754 B1 * 10/2001 DeSantis ............... H04W 16/18
  455/429

(Continued)

*Primary Examiner* — Nimesh Patel
(74) *Attorney, Agent, or Firm* — Perkins Coie LLP

(57) ABSTRACT

Systems and methods are described herein for analyzing the performance of a communications network (e.g., a mobile telecommunications network) using customer-centric and/or subscriber-centric data and information. In some embodiments, the systems and method may determine key performance indicators for a communications network by accessing call detail records from multiple communications network sources, generating a database of one or more customer stats table (CSTs) based on the accessed call records, wherein the CSTs include records for each individual customers of the communications network, and determining one or more key performance indicators (KPIs) for the overall network based on the records stored by the one or more customer stats tables.

19 Claims, 16 Drawing Sheets

(51) Int. Cl.
*H04M 3/51* (2006.01)
*H04W 24/10* (2009.01)

(52) U.S. Cl.
CPC ...... *H04W 24/10* (2013.01); *H04M 2203/401* (2013.01); *H04M 2203/551* (2013.01); *H04M 2203/556* (2013.01); *H04M 2203/558* (2013.01); *H04M 2207/18* (2013.01)

(58) Field of Classification Search
CPC ..... H04W 16/08; H04W 28/18; H04W 16/00; H04W 36/30; H04W 88/06; H04W 36/32; H04W 36/14; H04W 16/18; H04W 36/0072; H04W 36/0083; H04W 36/0088; H04W 36/18; H04W 88/10; H04W 24/04; H04W 36/0005; H04W 36/22; H04W 92/02; H04W 36/0061; H04W 72/048; H04W 16/10; H04W 28/26; H04W 36/00; H04W 36/0094; H04W 36/24; H04W 52/0232; H04W 52/24; H04W 76/028; H04W 16/26; H04W 36/20; H04W 76/04; H04B 17/382; H04B 17/309; H04B 17/345; H04B 7/0413; H04B 7/0417; H04B 7/0619; H04B 7/0689; H04B 17/318; H04B 17/336; H04B 17/391; H04B 17/3911; H04B 17/3913; H04L 41/145; H04L 1/0021; H04L 1/1812; H04L 1/1887; H04L 41/0677; H04L 41/5003; H04L 43/16; H04L 5/0073; H04L 67/322; H04L 43/08; H04L 51/04; H04L 51/30; H04L 51/38; H04M 15/8033; H04M 15/8038; H04M 15/8083; H04M 2215/0184; H04M 2215/22; H04M 2215/32; H04M 2215/34

See application file for complete search history.

(56) References Cited

U.S. PATENT DOCUMENTS

| | | | |
|---|---|---|---|
| 9,491,569 | B1 | 11/2016 | Sandhu et al. |
| 9,585,036 | B1 | 2/2017 | Tektumanidze et al. |
| 10,091,679 | B1 | 10/2018 | Munar et al. |
| 2007/0099561 | A1 | 5/2007 | Voss |
| 2011/0263244 | A1 | 10/2011 | Kobayashi et al. |
| 2012/0252440 | A1 | 10/2012 | Watanabe |
| 2013/0223403 | A1 | 8/2013 | Chen et al. |
| 2013/0242736 | A1 | 9/2013 | Tarraf et al. |
| 2016/0142917 | A1* | 5/2016 | Calo .................... G06Q 20/102 705/7.33 |
| 2016/0248624 | A1 | 8/2016 | Tapia et al. |
| 2017/0013439 | A1 | 1/2017 | Ligeret et al. |
| 2017/0181024 | A1* | 6/2017 | Shaw ................. H04L 41/5025 |

* cited by examiner

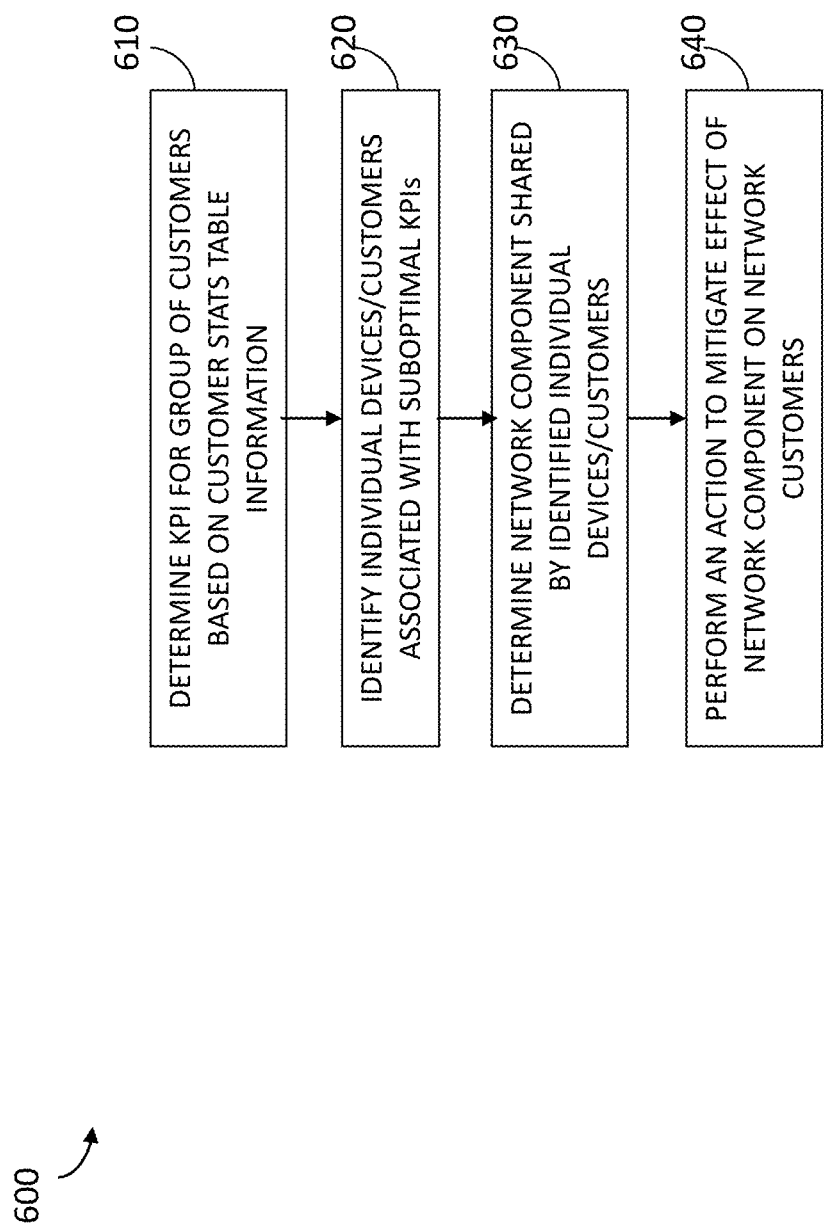

| IMEI | IMSI | MSISDN | BRAND | DEVICE_TE... | DEVICE_MO... | VOICE_2G_CA_LL_CNT | VOICE_2G_DR_OP_CN T | VOICE_2G_MH_T_SEC | VOICE_3G_CA_LL_CNT | VOICE_3G_DR_OP_CN T | VOICE_3G_MH_T_SEC | VOICE_VOLTE_CALL... | VOICE_VOLTE_DROP... | VOICE_VOLTE_MHT_S... |
|---|---|---|---|---|---|---|---|---|---|---|---|---|---|---|
| ..09506623097 | 31026039532.. | 19548266944 | Postpaid | LTE | Samsung_N9.. | 24 | 7 | 640 | 33 | 4 | 894 | 228 | 42 | 919 |
| ..87806579292 | 31026041619.. | 16198633382 | Postpaid | LTE | Apple_A1522.. | 36 | 14 | 413 | 33 | 11 | 538 | 234 | 39 | 480 |
| ..28307194869 | 31026049539.. | 17206091166 | Postpaid | LTE | Apple_A1687.. | 8 | 2 | 756 | 7 | 5 | 688 | 271 | 38 | 1,340 |
| ..28307152122 | 31026049545.. | 16145565269 | Postpaid | LTE | Apple_A1687.. | 53 | 7 | 793 | 6 | 1 | 115 | 294 | 33 | 602 |
| ..39206608287 | 31026031543.. | 16124128322 | Postpaid | LTE | Apple_A1522.. | 108 | 32 | 343 | 60 | 13 | 339 | 359 | 32 | 385 |
| ..88106285570 | 31026042849.. | 19547930528 | Postpaid | LTE | Samsung_G9.. | 8 | 2 | 1,234 | 6 | 1 | 195 | 129 | 31 | 1,446 |
| ..33607199682 | 31026042784.. | 16146323395 | Postpaid | LTE | Apple_A1687.. | 23 | 7 | 785 | 23 | 5 | 420 | 259 | 31 | 325 |
| ..80508531474 | 31026065758.. | 16146959207 | Postpaid | LTE | Apple_A1778.. | 44 | 8 | 277 | 76 | 4 | 287 | 429 | 31 | 272 |
| ..75607180408 | 31026049465.. | 16145994178 | Postpaid | LTE | Samsung_N9.. | 2 | 0 | 26 | 12 | 0 | 3,669 | 105 | 30 | 3,982 |
| ..39206842468 | 31026065766.. | 19525944153 | Postpaid | LTE | Apple_A1522.. | 45 | 6 | 780 | 31 | 3 | 439 | 353 | 30 | 585 |
| ..87706349380 | 31026022296.. | 16148226297 | Postpaid | LTE | Apple_A1522.. | 39 | 14 | 793 | 37 | 6 | 503 | 240 | 30 | 261 |
| ..30006491558 | 31026059906.. | 16146748163 | Prepaid | LTE | Apple_A1549.. | 1 | 0 | 127 | 41 | 1 | 236 | 272 | 30 | 313 |
| ..80208938947 | 31026075511.. | 16148158488 | Postpaid | LTE | Apple_A1778.. | 37 | 16 | 419 | 45 | 2 | 124 | 287 | 29 | 499 |
| ..45206362051 | 31026059717.. | 13128666891 | Postpaid | LTE | Apple_A1522.. | 79 | 17 | 343 | 33 | 6 | 450 | 387 | 28 | 335 |
| ..73407199682 | 31026040659.. | 12708041068 | Postpaid | LTE | Apple_A1687.. | 39 | 5 | 381 | 10 | 5 | 325 | 433 | 28 | 334 |
| ..71506078806 | 31026040659.. | 16143771396 | Postpaid | LTE | Samsung_G9.. | 16 | 6 | 1,373 | 8 | 6 | 537 | 160 | 28 | 869 |
| ..92603782934 | 31026047813.. | 14048221929 | MetroPCS HSPA/LTE | LTE | 2TE_Z981_Z.. | 9 | 1 | 783 | 3 | 3 | 429 | 231 | 28 | 1,017 |
| ..05007370280 | 31026031524.. | 16123101584 | Postpaid | LTE | Apple_A1524.. | 16 | 9 | 789 | 3 | 2 | 1,343 | 198 | 27 | 698 |

| MARKET | IMSI | MSISDN | Data Payload (GB) | LTE_COVERAGE |
|---|---|---|---|---|
| WASHINGTO N DC | 310260005543596 | 12024093032 | 1.70 | 35.45 |
| | 310260006113078 | 17038890934 | 0.61 | 39.83 |
| | 310260006119493 | 15712306483 | 0.07 | 40.27 |
| | 310260006137940 | 19105272229 | 0.63 | 20.09 |
| | 310260006138395 | 12703986798 | 0.01 | 24.39 |
| | 310260006147145 | 14439546972 | 0.79 | 36.85 |
| | 310260006183005 | 18475055235 | 0.61 | 49.25 |
| | 310260006207981 | 18094009985 | 0.37 | 44.53 |
| | 310260006230040 | 13016047574 | 0.03 | 36.44 |
| | 310260006246019 | 12405662888 | 0.09 | 47.98 |
| | 310260006266144 | 13012219596 | 0.54 | 30.24 |
| | 310260006270037 | 12405046473 | 2.65 | 32.31 |
| | 310260006280432 | 12406753099 | 0.46 | 29.97 |
| | 310260006294153 | 15719917023 | 2.77 | 39.99 |
| | 310260006300201 | 15712243951 | 0.49 | 46.80 |
| | 310260006316007 | 14439050950 | 0.55 | 38.69 |
| | 310260006335697 | 14435463987 | 0.26 | 40.44 |
| | 310260006405660 | 14803348620 | 0.65 | 49.70 |

FIG. 8B

DETERMINING NETWORK PERFORMANCE METRICS USING CUSTOMER-SPECIFIC INFORMATION

CROSS-REFERENCE TO RELATED APPLICATIONS

This application is a continuation of U.S. patent application Ser. No. 15/462,746, filed on Mar. 17, 2017, and entitled "DETERMINING NETWORK PERFORMANCE METRICS USING CUSTOMER-SPECIFIC INFORMATION," now U.S. Pat. No. 10,091,679; the disclosure of which is hereby incorporated herein in its entirety by reference.

BACKGROUND

The performance of a communications network (or, mobile network) is often reflected by various key performance indicators (KPIs). Example KPIs include and/or reflect dropped call rates, wireless leakage, network usage, network quality, network speed, network reliability, costs to customers, and many other indicators.

Typically, a network provider measures and determines network-centric KPIs, such as KPIs that are based on data associated with the operation or performance of network components, such as cells, base stations, and so on. For example, given a network of 60,000 or so cell sites, the provider may determine KPIs associated with voice dropped call rates, network registration metrics, network availability data, and so on. However, in merely using network and/or component specific data, a network provider may face various issues associated with identifying and determining KPIs of value to various stakeholders for the network, such as customers, subscribers, vendors, and so on.

BRIEF DESCRIPTION OF THE DRAWINGS

FIG. 6 is a flow diagram illustrating a method for identifying suboptimal network components using data from the customer stats table (CST).

FIGS. 7A-7D are display diagrams illustrating an example scenario of identifying poor performing network cells using CST data.

FIGS. 8A-8C are display diagrams illustrating an example scenario of identifying high LTE leakage network cells using CST data.

DETAILED DESCRIPTION

Figure 1:
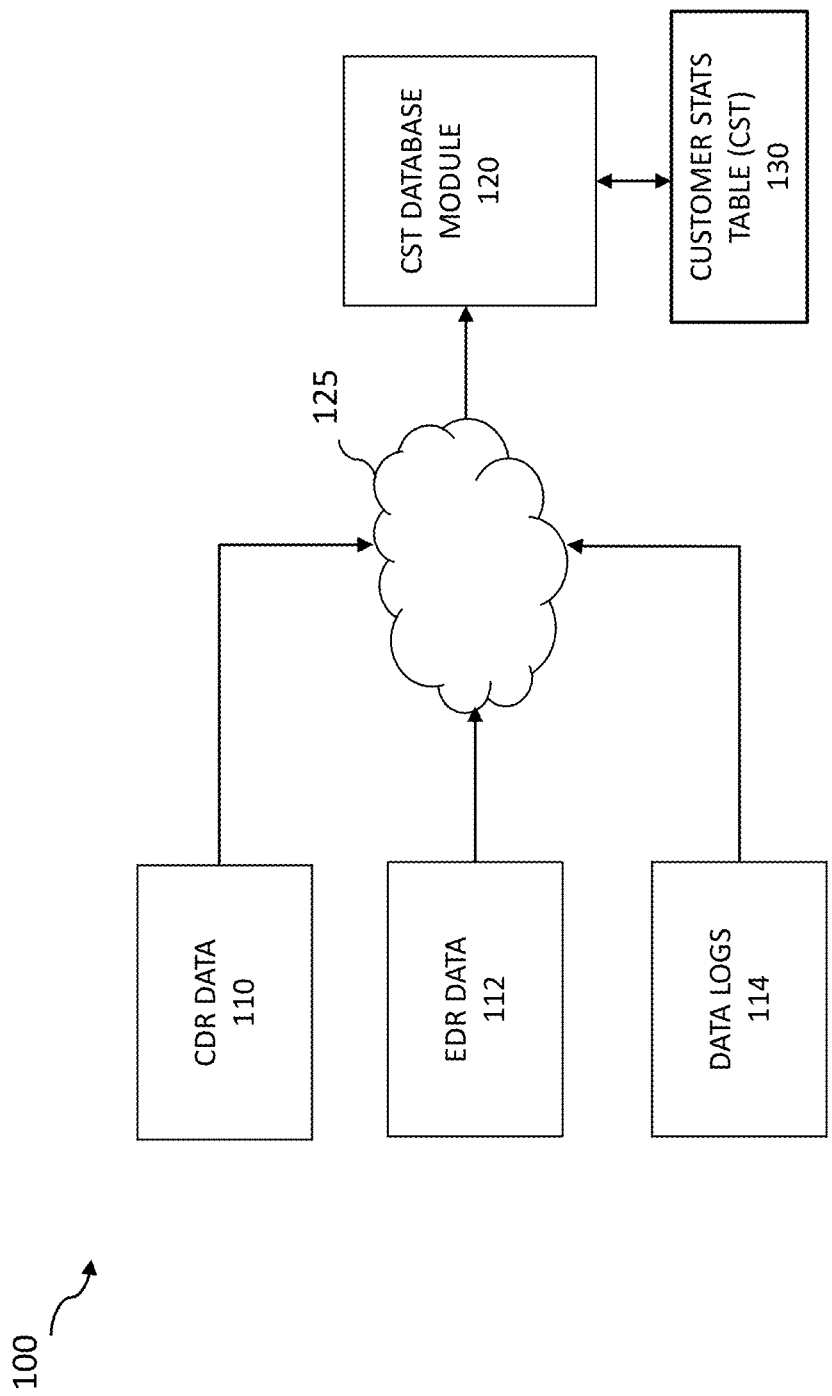
FIG. 1 is a block diagram illustrating a suitable network environment for generating a customer stats table (CST) for a communications network.

Systems and methods are described herein for analyzing the performance of a communications network (e.g., a mobile telecommunications network) using customer-centric and/or subscriber-centric data and information. For example, the systems and methods may access and aggregate records for every call (e.g., voice call, message, or data session) within a network over a period of time, and determine various key performance indicators (KPIs) for the overall network (or portions of the network) that are based on the records and the customers associated with the calls within the network.

In some embodiments, the systems and method may determine key performance indicators for a communications network by accessing call detail records from multiple communications network sources, generating a database of one or more customer stats table (CSTs) based on the accessed call records, wherein the CSTs include records for each individual customers of the communications network, and determining one or more key performance indicators (KPIs) for the overall network based on the records stored by the one or more customer stats tables.

A customer stats table, or CST may store various customer-centric information, including customer usage data for customers of the communications network, customer profile data for the customers of the communications network, customer top cell usage data for the customers of the communications network, and so on. Using such data, the systems and methods determine many different KPIs that represent the overall performance of the network, including dropped call rates, LTE leakage metrics, and so on, for the network.

In some embodiments, the systems and methods may utilize the CSTs storing subscriber-centric data when troubleshooting a network in an attempting to identify weak points or pain points for subscribers of the network. For example, the systems and methods may identify network cells within a communications network providing a suboptimal performance for subscribers of the communications network by determining one or more key performance indicators (KPIs) for the communications network based on subscriber-centric information stored by one or more customer stats tables (CSTs), identifying individual subscribers experiencing suboptimal performance based on the determined KPIs for the communications network; and determining one or more network cells within the communications network that share the most identified individual subscribers experiencing the suboptimal performance.

Thus, in some embodiments, the systems and methods utilize customer-centric data, organized and/or stored as different CSTs within a database, to act as building blocks for determining performance indicators that represent customer experience issues (e.g., pain points), customer profiles, network usage, and other network performance indicators.

Using customer-specific data, as opposed to conventional network-specific and/or network-derived data, enables the systems and methods to provide a more granular and accurate insight into the performance of a network, as well as business insights into how the network affects its customers and users and how the network is used by different groups of customers, markets of customers and so on, among other benefits.

The following description provides specific details for a thorough understanding of, and enabling description for, various embodiments of the technology. One skilled in the art will understand that the technology may be practiced without these details. In some instances, well-known structures and functions have not been shown or described in detail to avoid unnecessarily obscuring the description of the embodiments of the technology. It is intended that the terminology used in the description presented below be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section.

Example Network Configurations

FIG. 1 is a block diagram illustrating a suitable network environment 100 for generating customer stats tables (CSTs) for a communications network.

A CST database module, such as a module hosted by a server, may access, receive, obtain, and/or retrieve data from various communications network data sources over a network 125, such as a call detail record (CDR) data source 110, an event data record (EDR) data source 112, one or more data log sources 114 that log data associated with network performance, and so on.

For example, an IMS network includes a Telephone Application Server (TAS) that creates or generates call detail records (CDR) for each call session within or facilitated by the IMS network 130. A call detail record includes various details associated with each call within the IMS network, including information (e.g., the phone number) identifying the calling party, information (e.g., phone number) identifying the called (or, answering party), the date and time of the call, the duration of the call, billing information associated with the call, information identifying the access components, information identifying the call handling components, various codes (e.g., cause codes or response codes) or indicators associated with faults or errors in handling or connecting the call, information identifying the disposition of the call, and so on. Similarly, the CST database module 120 may collect data from other sources within different networks.

Using the accessed CDR, EDR, and/or log data, the CST database module generates a database of customer stats tables (CST), which include records that relate individual customers and/or subscribers with various calls (e.g., voice calls, messages, and/or data sessions) and associated events (e.g., completed calls, dropped calls, network leakage, cell usage, and so on). Further details regarding the generating of the CSTs, the data stored in the CSTs, and the use of the CSTs are described herein.

FIG. 1 and the discussion herein provide a brief, general description of the suitable computing environment 100 in which the systems and methods can be supported and implemented. Although not required, aspects of the systems and methods are described in the general context of computer-executable instructions, such as routines executed by a general-purpose computer, e.g., mobile device, a server computer, or personal computer. Those skilled in the relevant art will appreciate that the system can be practiced with other communications, data processing, or computer system configurations, including: Internet appliances, handheld devices (including tablet computers and/or personal digital assistants (PDAs)), all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the system reside on a server computer, while corresponding portions reside on a client computer such as a mobile or portable device, and thus, while certain hardware platforms are described herein, aspects of the system are equally applicable to nodes on a network. In an alternative embodiment, the mobile device or portable device may represent the server portion, while the server may represent the client portion.

In some cases, the communication network being measured and providing data may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. As described herein, the communications network may also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), Long Term Evolution (LTE) network), Voice over LTE (VoLTE), IMS network, or other communications network.

Examples of Determining Key Performance Indicators for a Network

Figure 2:
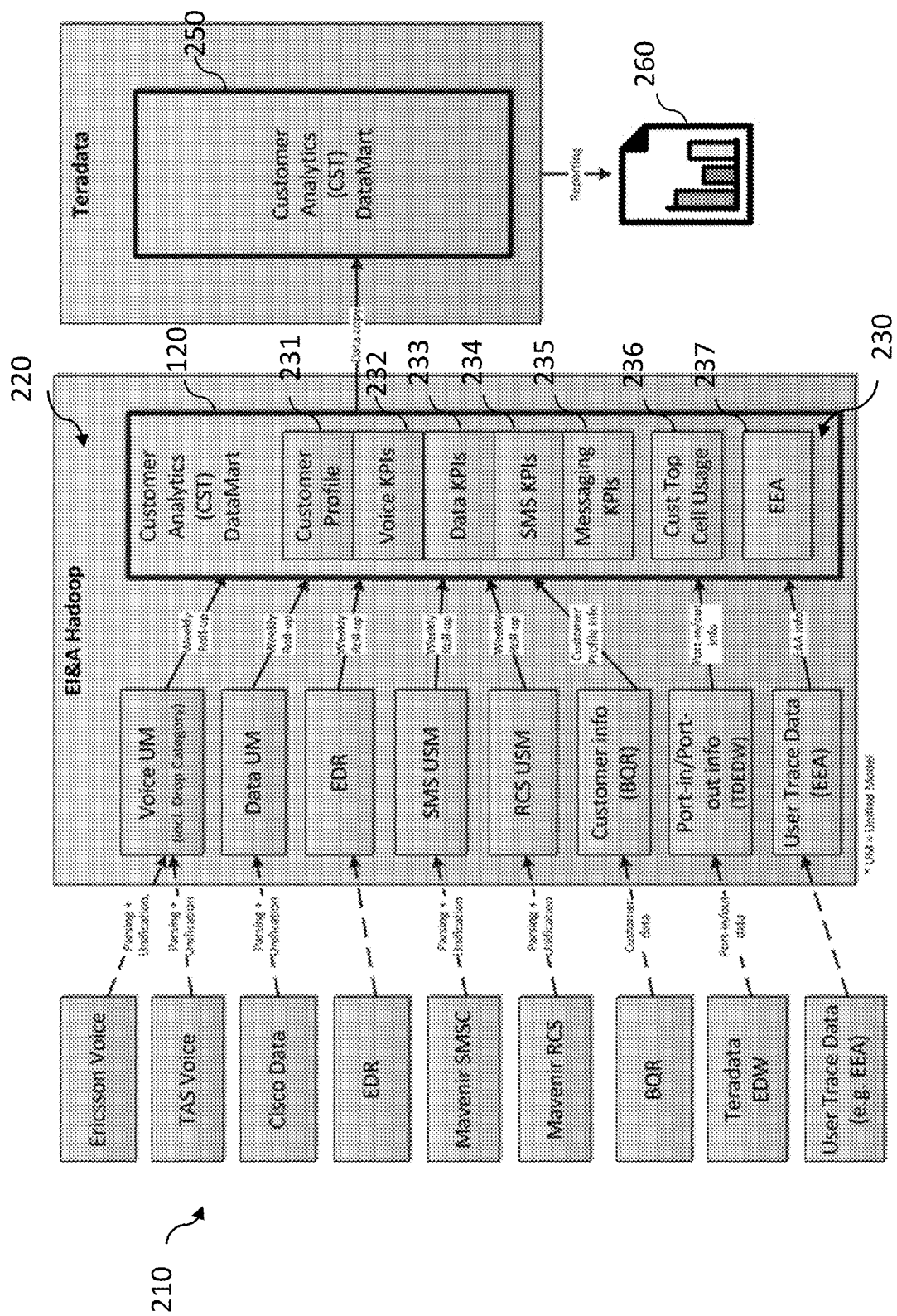
FIG. 2 is a block diagram illustrating information flows between network data sources and a database module.

As described herein, the systems and methods utilize customer-specific data and information when determining key performance indicators (KPIs) for a communications network. FIG. 2 is a block diagram illustrating information flows between network data sources and the database module 120, which generates the CSTs 130 using the received data.

The CST database module 120 may include functional modules or systems that are implemented with a combination of software (e.g., executable instructions, or computer code) and hardware (e.g., at least a memory and processor).

Accordingly, as used herein, in some examples a module or system is a processor-implemented module, system, or set of code and represents a computing device having a processor that is at least temporarily configured and/or programmed by executable instructions stored in memory to perform one or more of the particular functions that are described herein.

An EBDA (evidence based data analysis) module 220 may access and obtain data (e.g., records, logs, and so on) from various network monitoring data sources 210. For example, a voice unified model (UM) module receives voice call CDRs from different network data sources (e.g., "Ericsson Voice," "TAS Voice," and so on), a data UM module receives data CDRs from a network data source (e.g., "Cisco Data"), an EDR module receives EDR data from various event modules, an SMS USM module receives message CDRs from an SMSC (Short Message Service Center), an RCS USM receives RCS (Rich Communication Services) data from an RCS server, a Customer Profile module receives information from a customer provisioning data source (e.g., "BQR"), an enterprise data module (TDEDW) receives data from a billing and marketing data source, and a user trace module receives user or subscriber user trace data.

The EBDA module 220 performs evidence based data analysis to generate CSTs 230 that are based on the data received from the network data sources 210. The CSTs may store different types of data, and may include a customer profile CST 231, a voice KPI CST 232, a data KPI CST 233, an SMS KPI CST 234, a messaging KPI CST 235, a top cell usage CST 236, a user trace metrics CST 237, and so on.

In some cases, one or more copies 250 of the CSTs 230 are generated, and the systems and methods may perform actions using the data stored within the CSTs, such as generate reports 260 that present many different views representative of the KPIs determined for the communications network.

Therefore, the system, in some embodiments, includes a database module that accesses call detail records from multiple communications network sources and generates a database of one or more customer stats table (CSTs) based on the accessed call records, wherein the CSTs include records for each individual customers of the communications network, and a performance module that determines one or more key performance indicators (KPIs) for the overall network based on the records stored by the one or more customer stats tables.

As described herein, in some embodiments, the database of CSTs 120 acts as a single repository that stores customer-centric analytics data, such as various KPIs. For example, the CST database 120 may include CSTs storing customer usage data, customer profile data, and customer top cell usage data (e.g., data that indicates the cells most utilized by specific customers in a time period), as well as other CSTs.

Table 1 represents example data stored in a customer usage data CST (e.g., CST.BR.1.0) for a customer/subscriber:

TABLE 1

| CST BRID | KPI | Function |
| --- | --- | --- |
| CST.BR.1.2 | IMSI | The IMSI Number |
| CST.BR.1.9 | DATA_PLAN | The data plan for the subscriber |
| CST.BR.1.12 | DATA_MAX_UPLOAD_RATE | The maximum upload rate |

TABLE 1-continued

| CST BRID | KPI | Function |
| --- | --- | --- |
| CST.BR.1.17 | VOICE_AVG_DISTANCE | Average moving distance on voice call |
| CST.BR.1.18 | ROAMING_RADIUS | Median distance of each call to central location point of all calls |

Of course, the CST may include various other data, including data upload and download amounts across various bands or networks (e.g., LTE or 3G), the time using various networks, number of answered calls, number of dropped calls, number of messages received and/or missed, amount or identification of throttled subscribers, and so on.

A customer profile data CST for a customer/subscriber stores other types of data associated with a profile of a customer and his/her plan or device, such as identification information (e.g., IMSI), account status and inception information, device information (e.g., brand), data plan information, previous carrier information, and so on.

Furthermore, a customer top cell usage data CST for a customer/subscriber stores data associated with a customer's interactions with the communications network, such as information identifying the top cells for data usage (e.g., top 5 cells for data usage), information identifying a total amount of data usage for each cell, information identifying the top cells for voice or messaging calls, information identifying the top cells for dropped calls and/or the number of dropped calls per cell, and so on.

Figure 3:
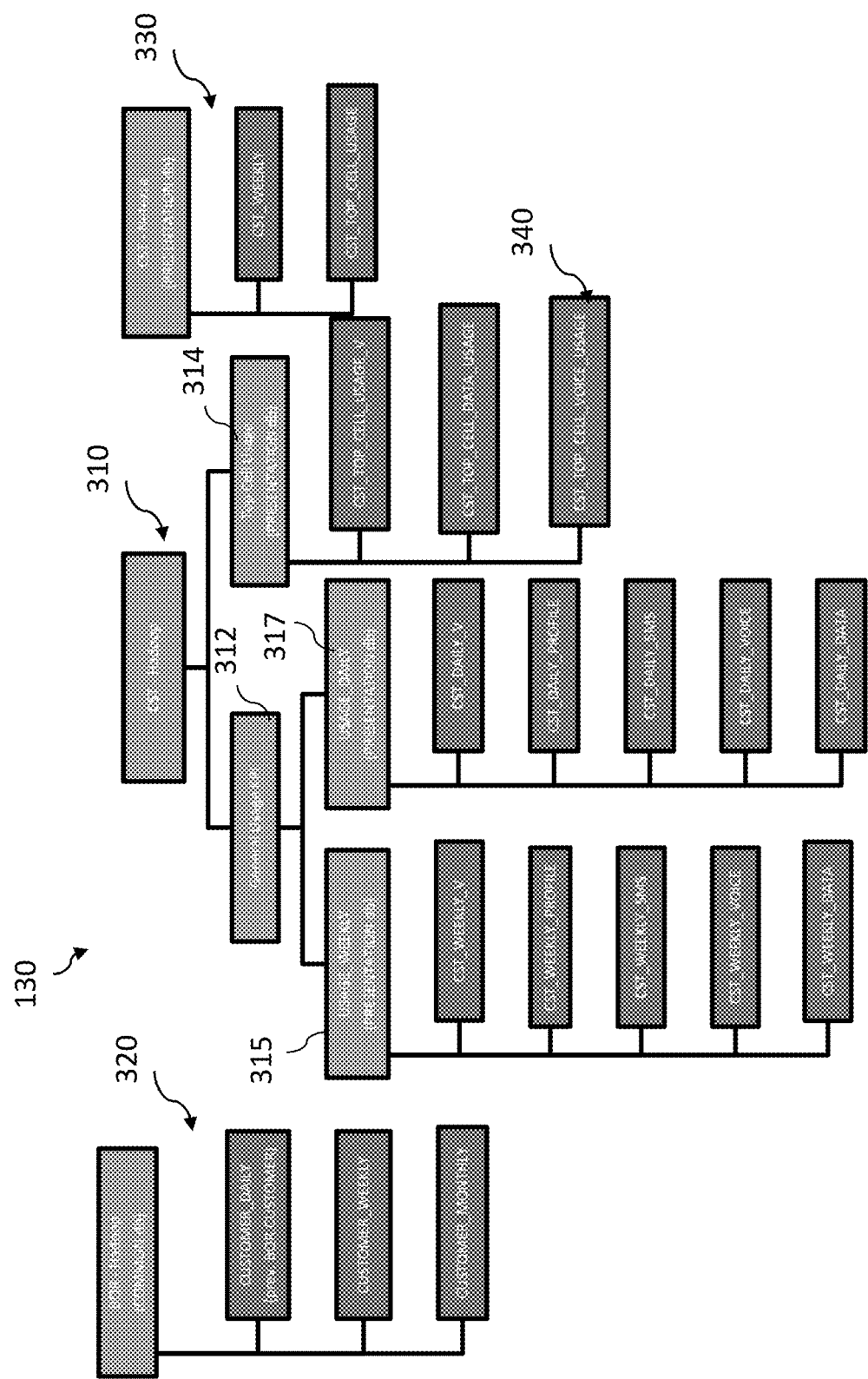
FIG. 3 is a diagram illustrating an example CST database of customer stats tables.

As described herein, the CSTs, in some embodiments, may store data in tree or hierarchical structures. FIG. 3 is a diagram illustrating an example CST database 130 of customer stats tables. As depicted, the CST includes an overall usage branch 310 that splits into a general usage CST 312 and a top cell usage CST 314, such as the CSTs shown in Table 1. For example, the general usage CST 312 may further split based on time period data, and store various data types in a weekly CST 315 and a daily CST 317.

Also, the CST database 130 may include a separate CST 320 for customer profile data, as described herein, as well as a CST copy 330 or duplicate that includes the data utilized when generating reports 160 and/or performing actions.

Thus, in some embodiments, the systems and methods utilize the customer-centric and customer-level data stored in various different CSTs to determine key performance indicators for a communications network and/or portions (e.g., areas, markets, network types, and so on) of the network.

Figure 4:
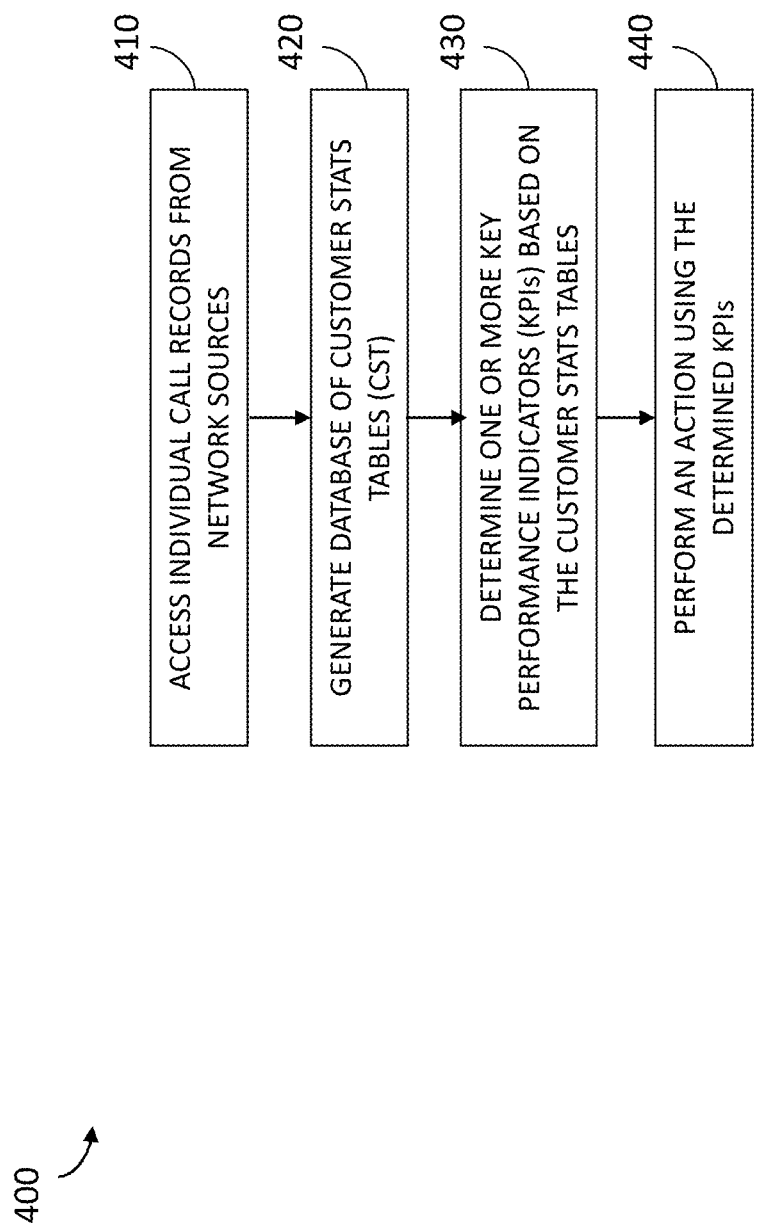
FIG. 4 is a flow diagram illustrating a method for performing actions using key performance indicators (KPIs) determined from customer-specific data sources.

FIG. 4 is a flow diagram illustrating a method 400 for performing actions using key performance indicators (KPIs) determined from customer-specific data sources. The method 400 may be performed by the CST database module 120, the EBDA module 220, or other systems described herein, and, accordingly, is described herein merely by way of reference thereto. It will be appreciated that the method 400 may be performed on any suitable hardware.

In operation 410, the system accesses call records from multiple communications network sources, such as sources 110, 112, 114, and/or 210. In some cases, the accessed call records (e.g., call detail records) include individual records for each occurrence of a call, message, and data session within the communications network.

In operation 420, the system generates a database of one or more customer stats table (CSTs) based on the accessed call records. For example, the EBDA module 220 performs evidence based data analysis to generate CSTs 230 that are based on the data received from the network data sources 210. The EBDA module 220 transforms raw call, event, and/or log data into navigable CSTs of customer-centric data that provide a historical record of the network and include CSTs that stores customer usage data for customers of the communications network, customer profile data for the customers of the communications network, and customer top cell usage data for the customers of the communications network.

As a result, the CST database module 120 may generate a database of CSTs that includes one or more CSTs that store customer-centric information for calls placed within the communications network over a weekly time period, one or more CSTs that store customer-centric information for calls placed within the communications network over a daily time period, and one or more CSTs that store customer-centric information for highest usage cells within the communications network with respect to data usage and voice call usage by customers of the communications network, as shown in FIG. 3.

In operation 430, the system determines one or more key performance indicators (KPIs) based on the one or more customer stats tables. For example, The CSTs may store different types of data, and the EBDA module 220 may generate a customer profile CST 231, a voice KPI CST 232, a data KPI CST 233, an SMS KPI CST 234, a messaging KPI CST 235, a top cell usage CST 236, a user trace data metrics CST 237, and so on.

The following examples illustrate various different KPIs determined by the system for a communications network. Of course, the system may generate many other KPIs not described herein:

A KPI associated with dropped call rates for certain customers of the communications network or groups of customers of the communications network;

A KPI associated with network type usage metrics for multiple different markets within the communications network;

A KPI associated with device connection metrics for multiple different markets within the communications network;

A KPI associated with a data usage distribution for customers across multiple different markets within the communications network;

A KPI associated with a network management customer distribution for customers across multiple different markets within the communications network;

A KPI associated with LTE leakage occurrences for certain customers of the communications network or groups of customers of the communications network; and so on.

In operation 440, the system performs an action that is based on the determined one or more key performance indicators (KPIs). For example, the system may generate various reports that present information associated with the determined KPIs, may utilize the determined KPIs to identify and/or determine one or more network cells that most affect the determined one or more key performance indicators (KPIs), and so on.

Figure 5A:
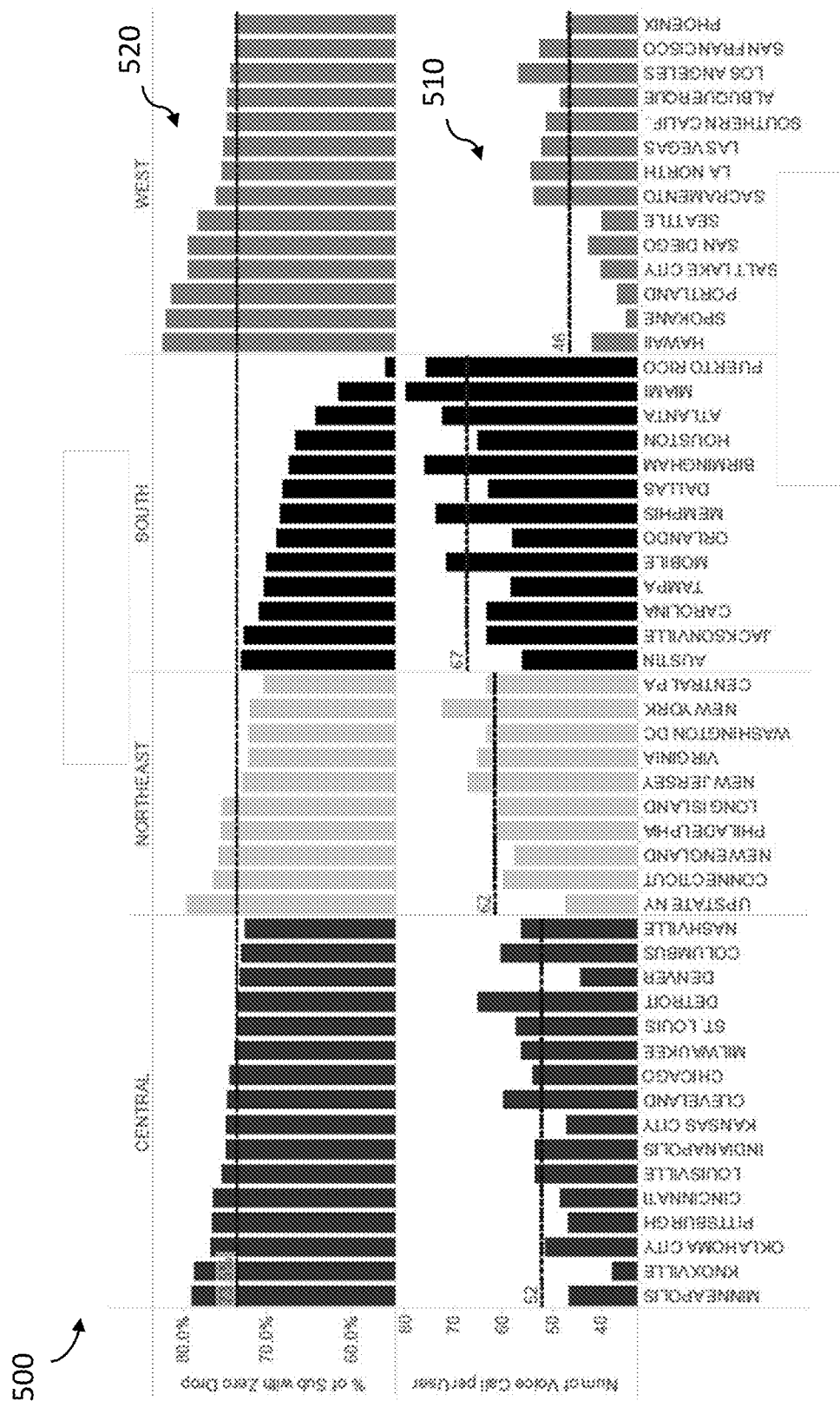
FIGS. 5A-5D are display diagrams illustrating reports based on KPIs generated from the customer stats table (CST).

As an example, FIGS. 5A-5D present some example reports based on KPIs generated from the customer stats table (CST) described herein. FIG. 5A presents a report that shows, for many different areas and markets (e.g., Minneapolis, Update NY, Puerto Rico, and so on), a graph 510 representing a KPI associated with a number of voice calls per user and a graph 520 representing a KPI associated with the number of users having zero dropped calls in a certain time period. Using this information, the system may identify various areas or cells within the network providing high quality of service and/or poor or suboptimal quality of service.

Figure 5B:
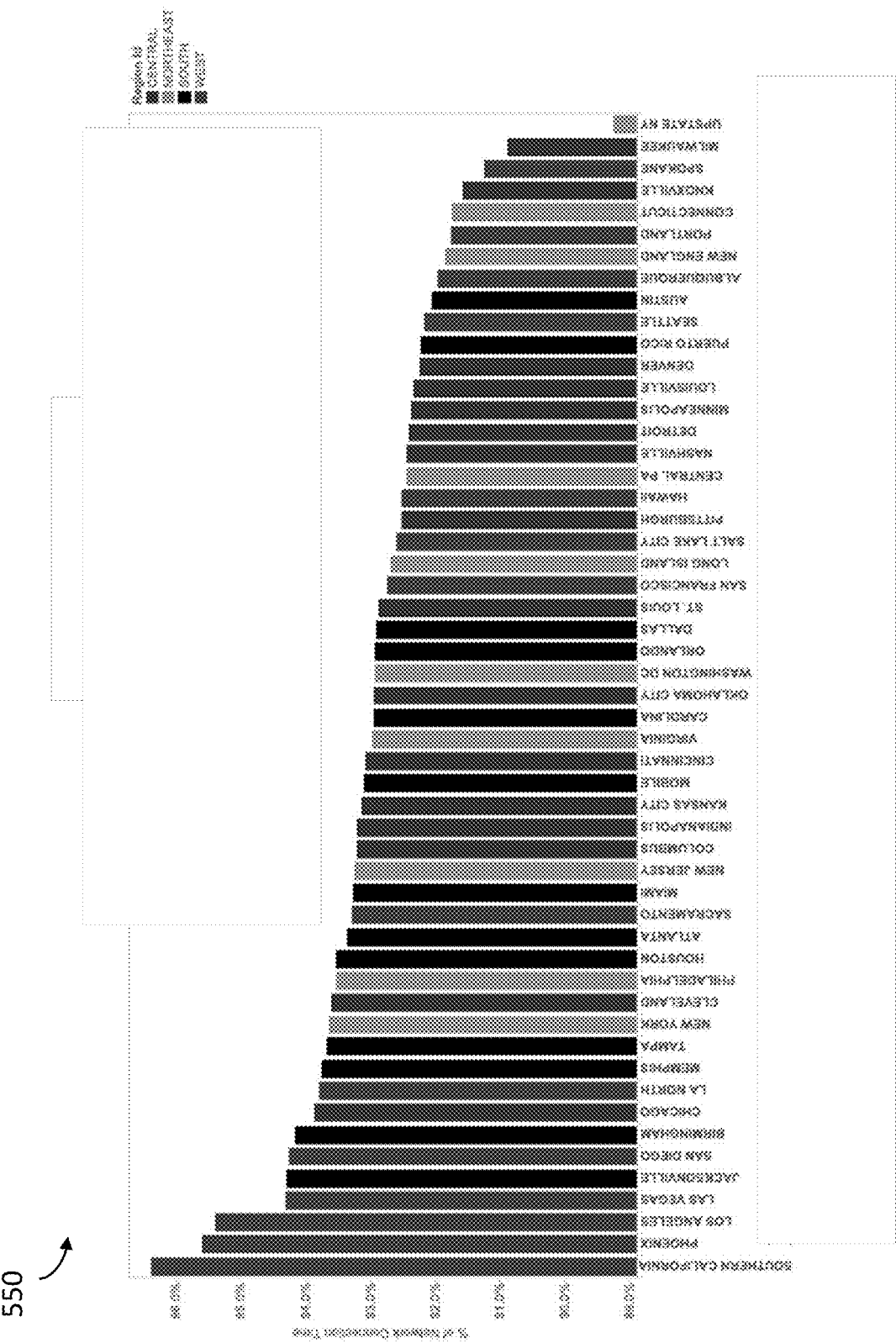

As another example, FIG. 5B presents a report, for many different areas and markets, that shows a graph 550 representing a KPI associated with a percentage of device connection time to a network (e.g., the amount of time in a week or day at which a customer device, when on, is connected to the network). Using this information, the system may identify various areas or cells within the network providing good or optimal coverage, poor or suboptimal coverage, and so on.

Figure 5C:
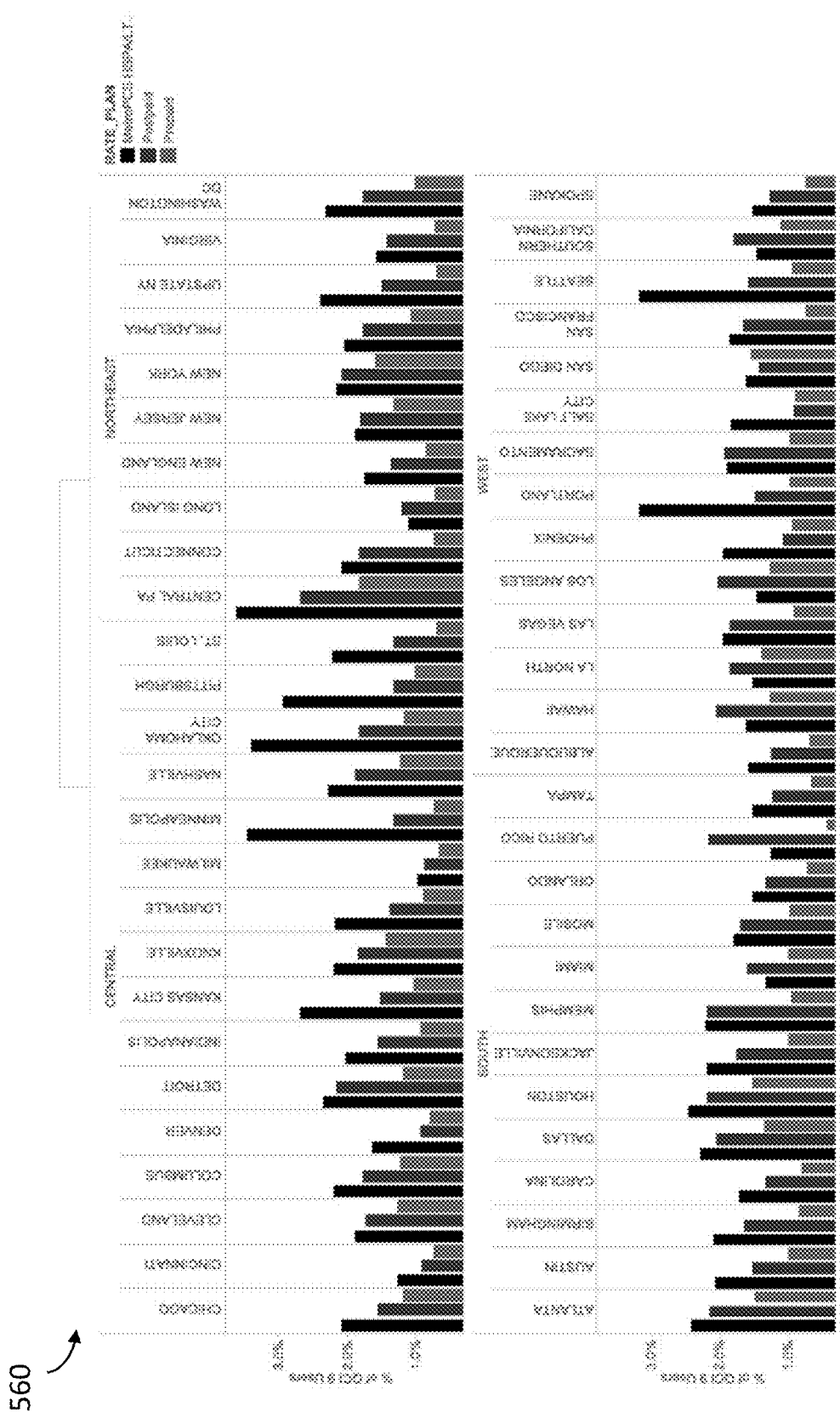
Figure 5D:
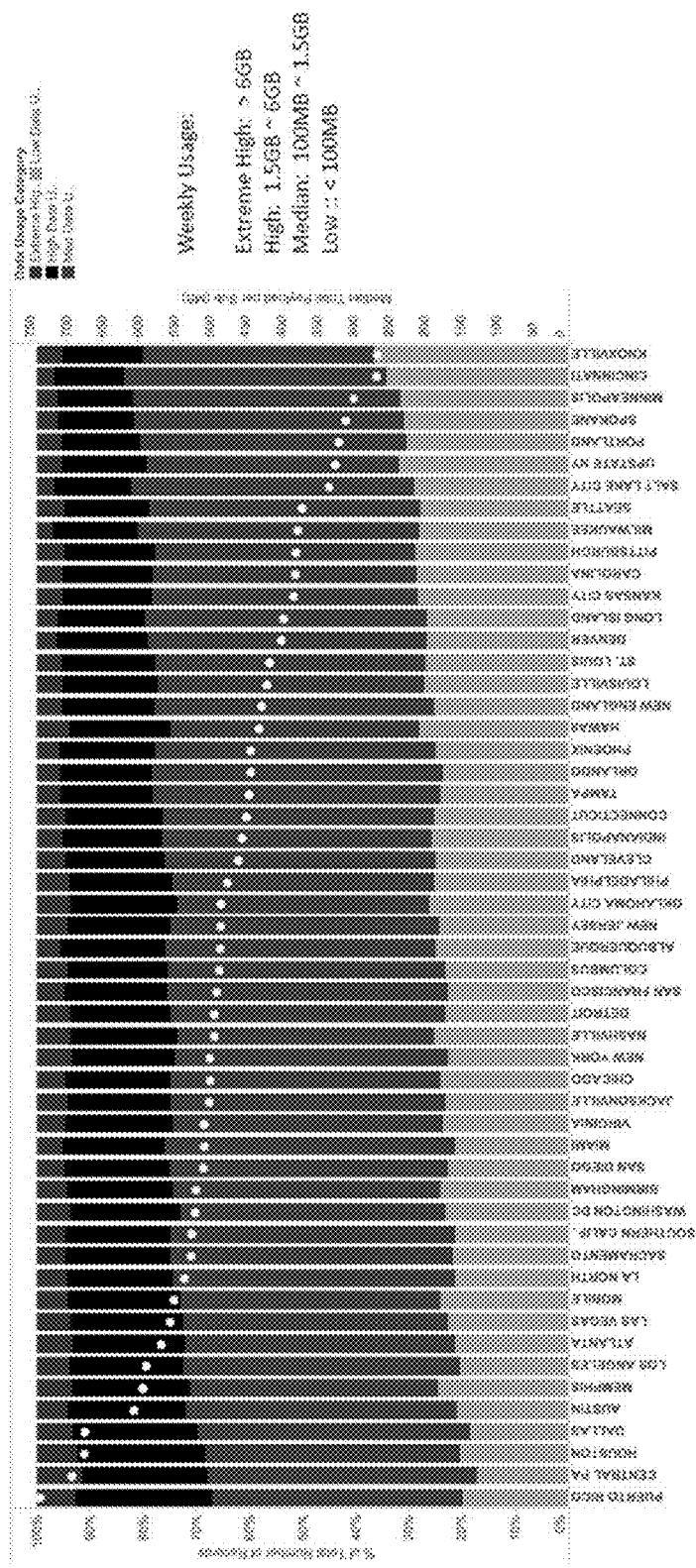

In FIG. 5C, the system presents a report, for various different markets and different rate plans, that shows a graph 560 representing a KPI associated with a percentage of "extreme" users (e.g., users with the highest data usage of the network, such as a top or high threshold percentage (e.g., 2 or 5 percent) of overall subscribers). Similarly, FIG. 5D presents a report, for many different areas and markets, that shows a graph 590 representing a KPI associated with subscriber data usage distribution. As depicted, the graph identifies, for each market, the percentage of extreme data usage subscribers, high data usage subscribers, medium data usage subscribers, and low data usage subscribers. Using this information, the system may adjust or target certain users or devices for modified plans, and/or may modify network resources to maintain high quality of service for the users.

Thus, in some embodiments, the systems and methods, utilizing the determined KPIs, perform various network analyses for the performance of the network and the impact on the network's performance on its subscribers.

As described herein, the system may utilize the results of such analyses to identify and/or troubleshoot areas within a communications network providing suboptimal and/or poor coverage or quality of service to its customers. FIG. 6 is a flow diagram illustrating a method 600 for identifying suboptimal network components using data from the customer stats table (CST). The method 600 may be performed by the systems described herein, and, accordingly, is described herein merely by way of reference thereto. It will be appreciated that the method 600 may be performed on any suitable hardware.

In operation 610, the system determines one or more key performance indicators (KPIs) for the communications network based on subscriber-centric information stored by one or more customer stats tables (CSTs). As described herein, the system may generate a customer profile CST 231, a voice KPI CST 232, a data KPI CST 233, an SMS KPI CST 234, a messaging KPI CST 235, a top cell usage CST 236, a user trace data metrics CST 237, and so on.

In operation 620, the system identifies individual subscribers experiencing suboptimal performance based on the determined KPIs for the communications network. For example, the system may identify an area or market having a high number of subscribers experiencing a certain unintended level of performance (e.g., higher than average number of dropped calls).

In operation 630, the system determines one or more network cells within the communications network that share the most identified individual subscribers experiencing the suboptimal performance. For example, after identifying the subscribers experiencing suboptimal network performance, the system, via the data stored in the relevant CSTs, identifies one or more network components (e.g., network cells or access points), shared by or in common with the identified subscribers.

In operation 640, the system performs an action to modify performance of the determined one or more network cells that share the most identified individual subscribers experiencing the suboptimal performance. For example, the system may cause network optimization processes to modify the operation of the network components, adjust the coverage or assignment of the network components, add or remove network components to the market, area, or location providing suboptimal performance, and so on.

Figure 7A:
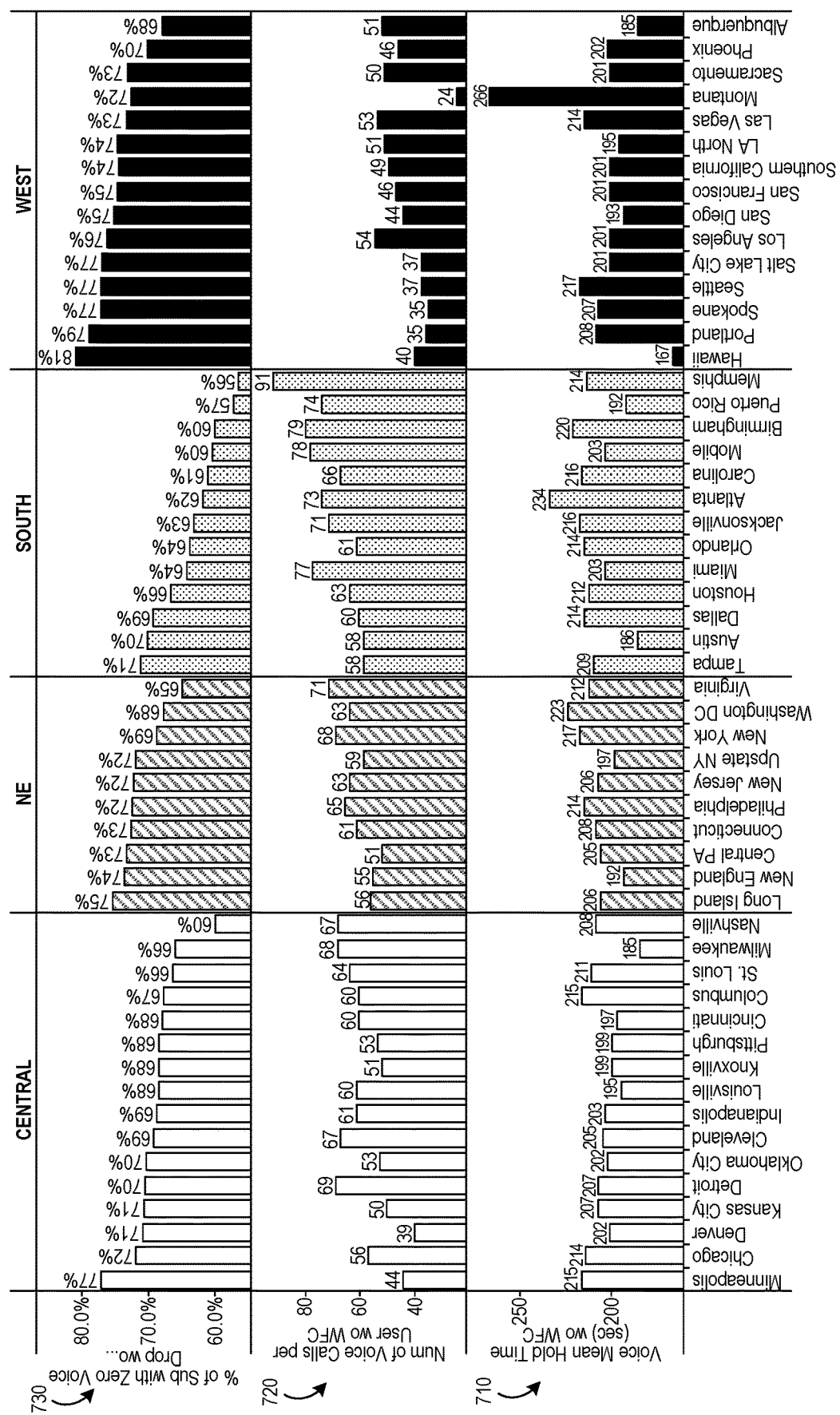
Figure 7B:
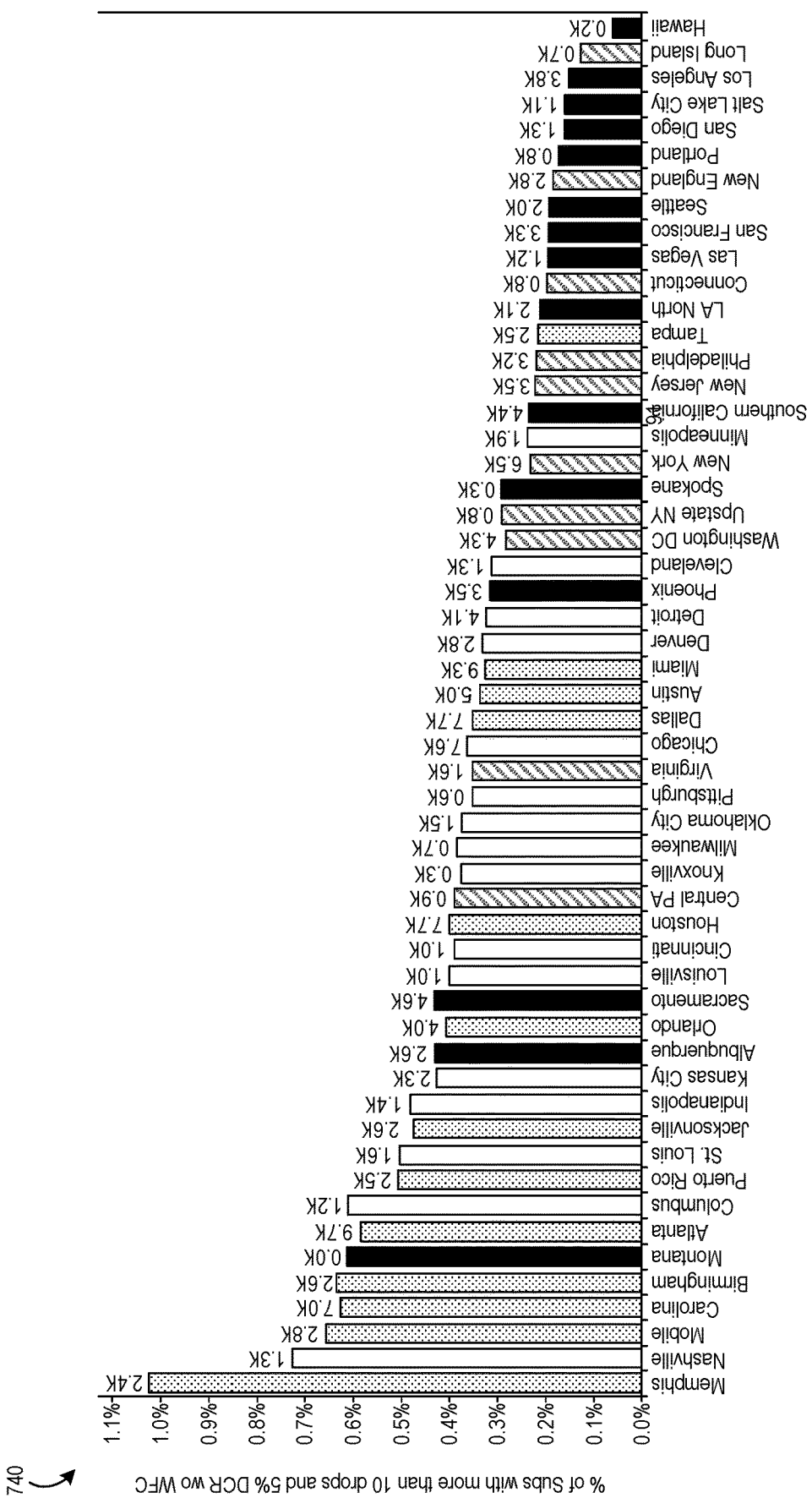
Figure 7D:
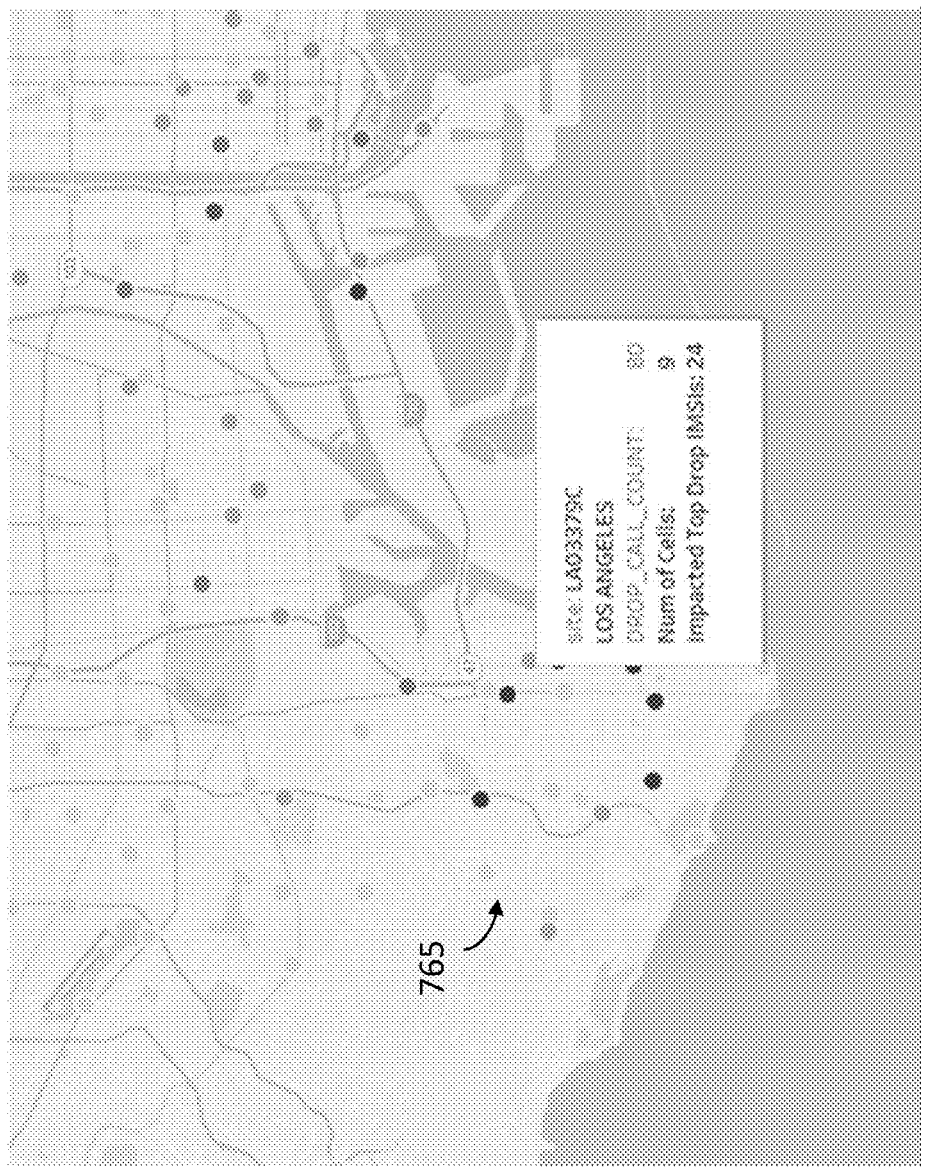

FIGS. 7A-7D depict an example scenario of identifying poor performing network cells using CST data. Referring first to FIG. 7A, the presented KPI information includes a graph 710 illustrating a KPI of voice mean hold times for subscribers across different markets, a graph 720 of the number of voice calls per user for the week across the markets, and a graph 730 of the percentage of users experiencing zero dropped calls in the week. FIG. 7B follows with a graph 740 that illustrates the percentage of users experiencing at least 10 dropped calls in the week. The graphs, therefore, depict the voice call experiences for every user of the network across different markets in the week.

FIG. 7C depicts a table 750 of each subscriber experiencing more than 10 dropped calls per week. Using data in the table, which represents data stored by a CST, the system may identify, as shown in the map 760 of FIG. 7D, the cells in common with the subscribers providing the suboptimal performance with respect to dropped calls. For example, the system identifies site "LA03379C" as having a certain number of total dropped calls, the number of cells servicing the site, and the top IMSIs affected by the cells.

Thus, using the granular CST data, the system may determine dropped call rates for subscribers of the communications network and identify a network cell or site that is associated with a high number of individual subscribers experiencing dropped calls within the communications network.

Figure 8A:
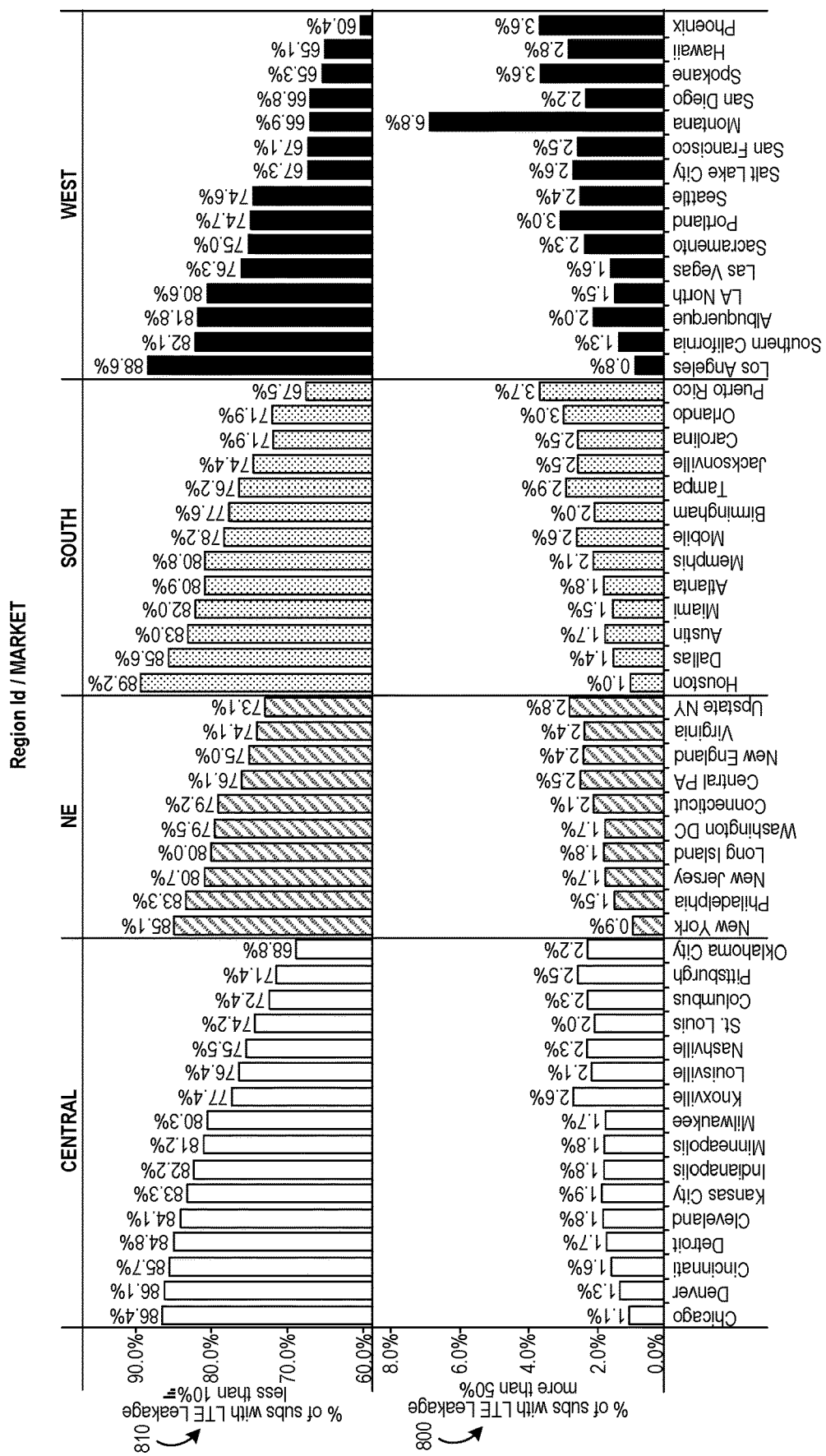
Figure 8C:
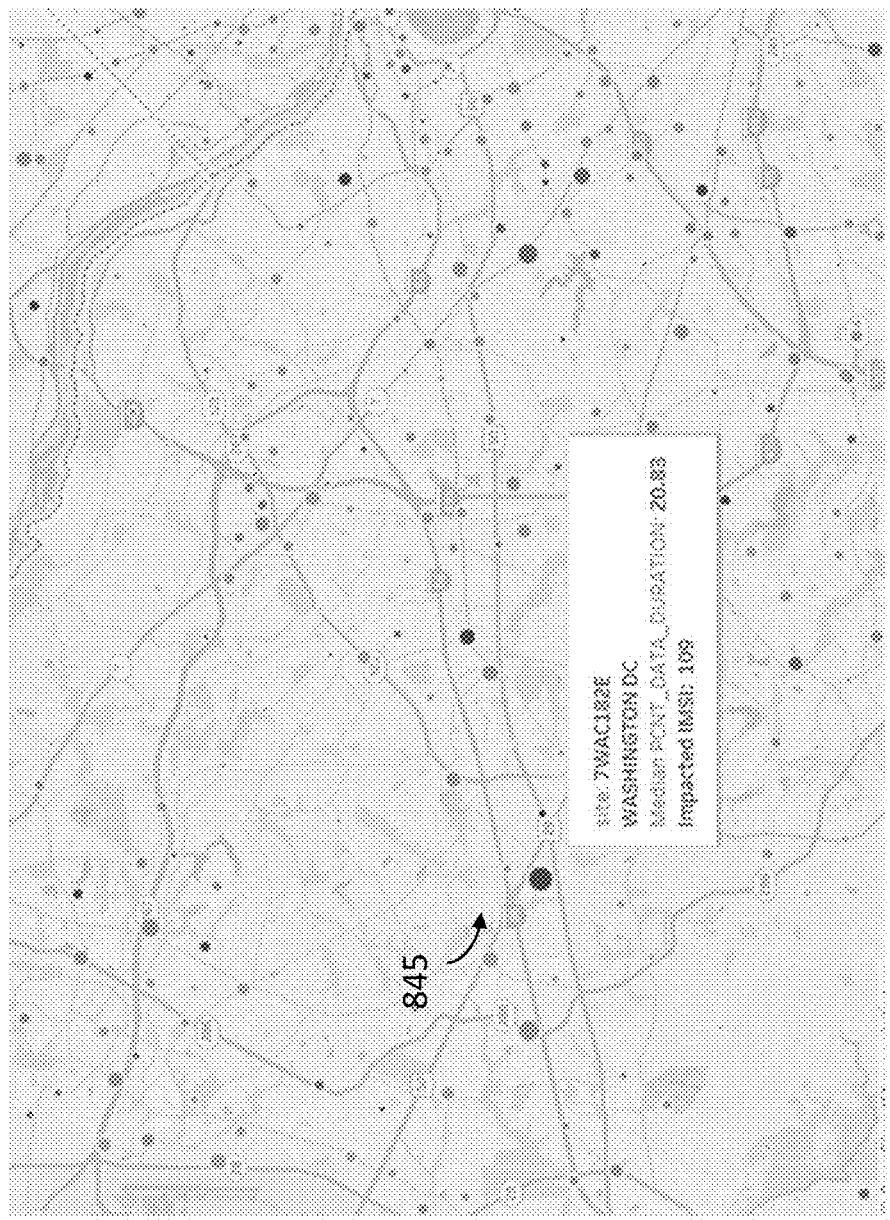

As another example, FIGS. 8A-8C depict an example scenario of identifying high LTE leakage network cells using CST data. FIG. 8A presents a graph 800 that identifies the number of subscribers across different markets experience LTE leakage in more than half of all data usage events, and a graph 810 that identifies a number of subscribers across the markets that experience low (less than 10%) LTE leakage problems. Thus, the KPIs depicted in the graphs present information reflecting LTE leakage issues for every single subscriber of a network.

In FIG. 8B, a table 820 presents the granular CST data (e.g., IMSI data payload, and LTE coverage information), which is utilized by the system to identify the subscribers having leakage issues within a specific market. Using the data, the system, as depicted by the map 840 of FIG. 8C, identifies a network cell site 845, cell site "7WAC182E", as having the most impacted subscribers ("Impacted IMSI 109"). The network, using the information, may perform actions to modify the performance of the cell site, as described herein.

Thus, using the granular CST data, the system may determine LTE leakage metrics for subscribers of the communications network, and identify a network cell or cell site that is associated with a high number of individual subscribers experiencing LTE leakage within the communications network.

As described herein, in some embodiments, the system and methods utilize raw, subscriber-level (e.g., customer-centric) data obtained from various network sources (call detail records from a TAS) to determine network-, area-, and/or market-wide key performance indicators (KPIs), which provide insights into the customer experiences (good and/or pain point type experiences) within the communications network.

The system has been described using various CST and KPI examples, however, other CST data and KPIs not explicitly described herein, may be generated by the system using the modules and techniques described herein.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively or additionally, network elements performing those functions could be replaced by two or more elements to perform portions of those functions. In addition, while processes, message/data flows, or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes, message/data flows, or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges. Those skilled in the art will also appreciate that the actual implementation of a database may take a variety of forms, and the term "database" is used herein in the generic sense to refer to any data structure that allows data to be stored and accessed, such as tables, linked lists, arrays, etc.

The teachings of the methods and system provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the technology can be modified, if necessary, to employ the systems, functions, and concepts of the various references described above to provide yet further embodiments of the technology.

These and other changes can be made to the invention in light of the above Detailed Description. While the above description describes certain embodiments of the technology, and describes the best mode contemplated, no matter how detailed the above appears in text, the invention can be practiced in many ways. Details of the system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the technology are presented below in certain claim forms, the inventors contemplate the various aspects of the technology in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the technology.

What is claimed is:

1. A method for determining key performance indicators (KPIs) for a communications network, the method comprising:
   accessing call records from multiple communications network sources,
   wherein the accessed call records include individual records for calls, messages, and data sessions within the communications network;
   generating a database of one or more customer stats tables (CSTs) that relate data for individual customers of the communications network to data for calls and events associated with the communications network,
   wherein the one or more customer stats tables store customer-centric data for the individual customers over a certain period of time, the customer-centric data including:
   customer usage data for customers of the communications network,
   customer profile data for the customers of the communications network, and
   customer top cell usage data for the customers of the communications network; and
   determining one or more key performance indicators (KPIs) for the communications network by:
   identifying individual subscribers experiencing a suboptimal performance and a parameter indicative of the suboptimal performance based on the customer-centric data for the individual customers stored by the one or more customer stats tables,
   determining the parameter indicative of the suboptimal performance to be a KPI among the one or more KPIs for the communications network, and
   performing an action that is based on the one or more KPIs.

2. The method of claim 1, wherein the accessing call records from the multiple communications network sources includes accessing call detail records (CDRs) event data records (EDRs), and data logs from components of the communications network.

3. The method of claim 1, wherein generating a database of one or more customer stats table (CSTs) based on the accessed call records includes generating a hierarchical database of CSTs having a first grouping of CSTs associated with a general usage KPI for the communications network, and a second grouping of CSTs associated with top cell usage for cells within the communications network.

4. The method of claim 1, wherein generating a database of one or more customer stats table (CSTs) based on the accessed call records includes generating a hierarchical database of CSTs that include:
   one or more CSTs that store customer-centric information for calls placed within the communications network over a weekly time period;
   one or more CSTs that store customer-centric information for calls placed within the communications network over a daily time period; and
   one or more CSTs that store customer-centric information for highest usage cells within the communications network with respect to data usage and voice call usage by the customers of the communications network.

5. The method of claim 1, wherein the determining the one or more key performance indicators (KPIs) based on the one or more customer stats tables includes determining dropped call rates for certain customers of the communications network or groups of customers of the communications network.

6. The method of claim 1, wherein the determining the one or more key performance indicators (KPIs) based on the one or more customer stats tables includes determining network type usage metrics for multiple different markets within the communications network.

7. The method of claim 1, wherein the determining the one or more key performance indicators (KPIs) based on the one or more customer stats tables includes determining device connection metrics for multiple different markets within the communications network.

8. The method of claim 1, wherein the determining the one or more key performance indicators (KPIs) based on the one or more customer stats tables includes determining a data usage distribution for the customers across multiple different markets within the communications network.

9. The method of claim 1, wherein the determining the one or more key performance indicators (KPIs) based on the one or more customer stats tables includes determining a network management customer distribution for the customers across multiple different markets within the communications network.

10. The method of claim 1, wherein the determining the one or more key performance indicators (KPIs) based on the one or more customer stats tables includes determining LTE leakage occurrences for certain customers of the communications network or groups of customers of the communications network.

11. The method of claim 1, further comprising:
determining one or more network cells that most affect the determined one or more key performance indicators (KPIs).

12. A non-transitory computer-readable medium whose contents, when executed by a computing system, cause the computing system to perform a method for identifying network cells within a communications network providing a suboptimal performance for subscribers of the communications network, the method comprising:
determining one or more key performance indicators (KPIs) for the communications network from subscriber-centric information stored by one or more customer stats tables (CSTs) and generated based on call records obtained from multiple communications network sources,
wherein the one or more customer stats tables include:
one or more CSTs that store the subscriber-centric information for calls placed within the communications network over a weekly time period;
one or more CSTs that store the subscriber-centric information for calls placed within the communications network over a daily time period; and
one or more CSTs that store subscriber-centric information for highest usage cells within the communications network with respect to data usage and voice call usage by customers of the communications network,
the determining including:
identifying individual subscribers experiencing suboptimal performance and a parameter indicative of the suboptimal performance based on the one or more KPIs determined from the subscriber-centric information stored by the one or more CSTs for the communications network;
determining the parameter indicative of the suboptimal performance to be a KPI among the one or more KPIs for the communications network and
performing as action that is based on the one or more KPIs.

13. The non-transitory computer-readable medium of claim 12, wherein the determining the one or more key performance indicators (KPIs) for the communications network based on the subscriber-centric information stored by the one or more CSTs includes determining dropped call rates for subscribers of the communications network; and
wherein determining one or more network cells within the communications network that share the most identified individual subscribers experiencing the suboptimal performance includes identifying a network cell that is associated with a high number of individual subscribers experiencing a dropped call within the communications network.

14. The non-transitory computer-readable medium of claim 12, wherein the determining the one or more key performance indicators (KPIs) for the communications network based on the subscriber-centric information stored by the one or more CSTs includes determining LTE leakage metrics for subscribers of the communications network; and
wherein determining one or more network cells within the communications network that share the most identified individual subscribers experiencing the suboptimal performance includes identifying a network cell that is associated with a high number of individual subscribers experiencing LTE leakage within the communications network.

15. The non-transitory computer-readable medium of claim 12, further comprising:
performing the action to modify performance one or more network cells that share the most identified individual subscribers experiencing the suboptimal performance.

16. The non-transitory computer-readable medium of claim 12, wherein the one or more CSTs are part of a hierarchical database of CSTs having a first grouping of CSTs associated with a general usage KPI for the communications network, and a second grouping of CSTs associated with top cell usage for network cells within the communications network.

17. A system of hardware components configured to determine key performance indicators for a communications network, the system comprising:
a database module, associated with a processor, that accesses call records from multiple communications network sources and generates a database of one or more customer stats tables (CSTs) based on the accessed call records,
wherein the one or more CSTs include records that relate data for individual customers of the communications network to data for calls and events occurring via the communications network; and
a performance module that determines one or more key performance indicators (KPIs) for the overall communications network by:
identifying individual subscribers experiencing a suboptimal performance and a parameter indicative of the suboptimal performance based on customer-centric data within the records stored by the one or more customer stats tables that relates the data for the individual customers of the communications network to the data for calls and events occurring via the communications network,
determining the parameter indicative of the suboptimal performance to be a KPI among the one or more KPIs for the communications network, and
performing an actions that is based on the one or more KPIs.

18. The system of claim 17, wherein the database module generates one or more customer stats tables that store the customer-centric data over a certain period of time, the customer-centric data including:
customer usage data for customers of the communications network,
customer profile data for the customers of the communications network, and
customer top cell usage data for the customers of the communications network.

19. The system of claim 17, wherein the performance module determines dropped call rates and LTE leakage metrics for the communications network based on the records stored by the one or more customer stats tables.

* * * * *